United States Patent [19]

Kyminas et al.

[11] Patent Number: 4,474,920

[45] Date of Patent: Oct. 2, 1984

[54] EMBOSSABLE COATING

[75] Inventors: Stanley C. Kyminas, St. Petersburg; Bernard J. Einhaus, Clearwater; Stephen G. Hinds, Seminole, all of Fla.

[73] Assignee: The Celotex Corporation, Tampa, Fla.

[21] Appl. No.: 424,660

[22] Filed: Sep. 27, 1982

Related U.S. Application Data

[62] Division of Ser. No. 252,120, Apr. 8, 1981, Pat. No. 4,353,949.

[51] Int. Cl.³ .............................................. C08K 5/05

[52] U.S. Cl. .................................... 524/386; 524/425; 524/445; 524/448; 524/394; 524/459; 524/528; 524/563

[58] Field of Search ............... 524/386, 459, 490, 528, 524/563

[56] References Cited

U.S. PATENT DOCUMENTS 4,048,380 9/1977 Blakey et al. ........................ 524/563

*Primary Examiner*—Joseph L. Schofer

*Assistant Examiner*—J. M. Reddick

*Attorney, Agent, or Firm*—James W. Grace; Charles W. Vanecek

[57] ABSTRACT

A method for producing a decorative design on a substrate by applying to the substrate an embossable coating comprising a filler, a binder, a release agent, a moisture control agent, and a liquid; drying the applied coating to remove a major portion of the liquid therefrom, sufficient liquid being retained to make the coating pliable and readily impressible by an embossing means; and subjecting the pliable coating to pressure contact with the embossing means, which is at ambient or an elevated temperature, to impress a decorative design into the coating; and the embossed coated substrate produced by the method.

22 Claims, 4 Drawing Figures

EMBOSSABLE COATING

This is a divisional of application Ser. No. 252,120, filed Apr. 8, 1981, now U.S. Pat. No. 4,353,949 Oct. 12, 1982.

BACKGROUND OF THE INVENTION

1. Field of the Invention

This invention relates to a method for decorating the surface of a substrate with an embossable coating, and to the product produced by this method. More particularly, this invention relates to a method of producing an embossed coating of high pattern fidelity on a substrate, especially on a cellulosic fiber board, and to the product produced thereby; the embossment can be produced without deforming the substrate.

2. Description of the Prior Art

The practice of embossing patterns and designs on the surfaces of ceiling tiles, ceiling panels and other substrates is widespread and the art of imparting a decorative appearance to these products is greatly varied. However, one basic premise, relating to the majority of the embossed products, is the fact that they receive a mechanical impression from an embossing plate or roll which deforms the substrate itself, causing the patterns to be pressed into the surface of the substrate. Other conventional methods employed, such as cutting, abrading, or routing out a portion of the surface of the substrate, also involve deformation of the substrate.

The usual prior art methods of pattern embossing are, therefore, limited to the deformation, by pressure or other means, of the substrate. In the process, the fibers of the substrate become fragmented. Also, the binder loses its cohesiveness due to the fragmentation resulting from the pressure of the embossing plate or roll. As a result, the substrate becomes weak and vulnerable to humidity and the force of gravity. Such a substrate will have poor dimensional stability, and will sag from the ceiling if it is a ceiling panel or tile. Furthermore, where such substrate is a cellulosic fiber board, water extractable color bodies, such as lignins, will migrate more readily to the surface, causing surface discoloration and yellowing, which are particularly objectionable on white ceiling tiles and lay-in panels. Another disadvantage associated with those prior art methods involving cutting, routing, and abrading is that they produce dust, thus creating a health and explosion hazard to workers. Complicated and expensive dust collection systems are required to cope with these hazards.

Prior art methods of pattern embossing are further often characterized by a great variety of processing steps, including base coating the substrate, drying, subsequent wetting and hot roll embossing, utilizing temperatures of up to 650° C. Apart from the many steps involved in these prior art methods, the use of a hot roll or plate at 650° C. requires a great amount of thermal energy and is accordingly not an energy efficient processing step.

It would be highly desirable if an improved method of producing an embossed coating on a substrate could be found which yields an embossed coating having a highly detailed pattern, is relatively simple and thermally efficient, and can be carried out without substantially deforming the substrate.

Objects of the Invention

It is therefore an object of the present invention to provide an improved embossable coating and method, whereby the coating is applied to a substrate and is embossed, yielding an embossed coating having a high degree of pattern fidelity.

It is another object of the present invention to provide an embossed coated substrate which is characterized by exceptional mechanical strength and dimensional stability.

It is still another object of the present invention to provide an improved method for applying a coating to a substrate and embossing the coating without deforming the substrate, which process is extendable to a variety of substrates otherwise unembossable or difficultly embossable.

It is a further object of the present invention to provide a new and economical method of forming an embossed coating on a substrate which is characterized by simplicity and a high degree of thermal efficiency.

Other objects and advantages of the present invention will become apparent to those skilled in the art when the instant disclosure is read in conjunction with the accompanying drawings.

Summary of the Invention

The above objects have been achieved in the embossable coating and method of the present invention, wherein the embossable coating is applied to and embossed on a substrate to yield an embossment having a particularly high degree of pattern fidelity. In accordance with the method of the invention, an embossable coating, comprising a liquid dispersion of a filler material, a binder for the filler, and moisture control and release agents, is applied to the surface of a substrate. Most of the moisture is removed from the coating in a conventional drying operation, as e.g., by placing the coated substrate in a suitable oven or drier, and the moist coating is impressed by an embossing roll or other suitable embossment means with a decorative design to yield the embossed, coated substrate of the invention. It is essential to the method of the invention that the coating being embossed contains sufficient moisture to make it pliable and readily impressible by the embossment means. Because of its plasticity and composition, the moist coating can be given a decorative design of superior pattern fidelity and an embossing pressure means can be utilized which embosses the coating while leaving the substrate substantially intact.

DESCRIPTION OF THE DRAWINGS

The invention will now be described with reference to the accompanying drawings in which.

DETAILED DESCRIPTION OF THE INVENTION

Figure 1:
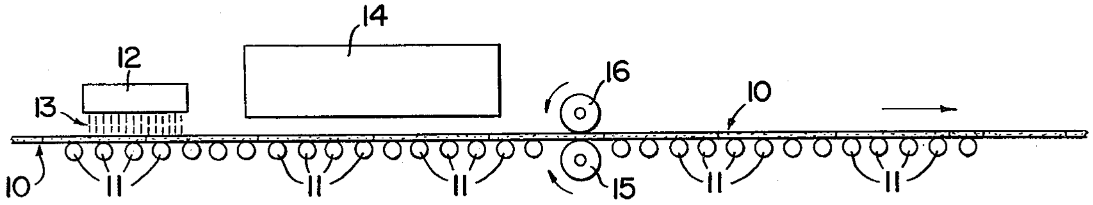
FIG. 1 is a diagrammatic side elevational view of a board forming process in accordance with the present invention.

Referring now more particularly to the drawings, FIG. 1 diagrammatically shows the method of the invention for embossing a pattern or design on a fibrous board 10. The fibrous board is transported via a continuous roller conveyor. A plurality of idler rolls 11 serve to support fibrous board 10 during its travel. Before the embossable coating of the invention is applied to the board 10, the board may be subjected to various conventional pre-embossment treatments, such as sanding to a uniform thickness, base coating with a primer, preliminary drying, etc. The fibrous board is then fed via the roller conveyor to a coating applicator 12 which applies the embossable coating 13 to the board's top surface. Any conventional coating applicator can be used, such as a spray coater, a roll coater, a curtain coater, or any other device capable of applying the coating uniformly on the substrate surface.

The embossable coating is generally applied to the substrate at the rate of 25 to 150 grams per square foot and preferably at the rate of 35 to 100, most preferably 45 to 65, grams per square foot. The application of less coating tends to yield a less clear and sharp embossing, while too much coating tends to mud-crack, and/or cure insufficiently, causing the coating to lift during embossing. Also, more of the embossable coating will be required on a highly absorptive substrate, unless the surface of such substrate is presealed against absorption. Unlike prior art embossing methods where the objective is to apply a relatively thin coating on a substrate surface and then to impress the desired pattern into both the substrate and the thin surfacing composition applied thereover, it is customary in accordance with the present embossing method to apply a greater than conventional amount of coating composition to the substrate. An embossment having a high degree of pattern fidelity can be impressed into the applied coating, with or without substantial compression of the substrate itself. Although the present embossing method can be accomplished with an accompanying substrate compression, the method has the distinct advantage that it can be performed without subjecting the substrate to the relatively severe compression characteristic of the prior art. In a preferred embodiment, the present method will typically involve no more than a 10% compression, and will more generally involve a compression of from 0 to 8%, preferably 0 to 5%, of the original substrate thickness. In an alternate embodiment of the invention, both sides of the board can be coated with the embossable coating of the invention and embossed.

The coated board is next passed via the conveyor to a drier 14, which may utilize any conventional source of heat, including infrared heat, convectional heat, hot air impingement, or other suitable means of extracting liquid from the coating film. Drier 14 operates to remove a major portion of the liquid therefrom. The drier also has a curing effect on the binder. The coating must not be completely dried in this step. When the board exits from the drier, its coating must retain the quantity of moisture needed to render it sufficiently pliable for subsequent embossment in accordance with the invention.

To place the embossable coating in this plastic condition, the coating is generally dried to the point where the moisture (e.g., water) content it retains is about 10 to 20, preferably 14 to 18, weight percent, based on the total weight of the coating. The drying temperature is typically about 100° C. to 300° C. and preferably about 180° C. to 240° C. It is desirable that the moist embossable coating be embossed within a short time after being dried to the plastic state, as, e.g., within about 30 seconds, while some heat is still retained.

Applicants have discovered that a coating composition of the invention which contains this plasticizing water content is particularly receptive to embossment. An especially sharp design can be impressed into the coating by any conventional embossing means, such as a heated or unheated embossing plate, a heated or unheated embossing roll, etc. In a preferred embodiment, the embossing is performed without significantly lessening the mechanical strength of its substrate. This is accomplished by subjecting the moisture plasticized coating to an embossing pressure which is sufficient to impress the desired pattern into the coating but insufficient to substantially compress the substrate.

After the preliminary drying, the coated board is introduced between two rolls 15 and 16 (FIG. 1). Bottom roll 15 has a fixed axis. Above roll 15 is the embossing roll 16 which is engraved with a suitable decorative pattern. Alternatively, bottom roll 15 can be the embossing roll or both rolls 15 and 16 can serve as embossing rolls. Embossing roll 16 has its axis vertically movable and control means (not shown) are provided for pressing roll 16 against the moist coating of board 10, whereby the roll's pattern is transferred to the coating. In an alternate embodiment, the top embossing roll 16 may be stationary while roll 15 moves vertically to adjust the distance between the two rolls. Rolls 15, 16 move at a speed that is preferably exactly the same as that at which the board is being advanced. The contact of the embossing means, e.g., roll or rolls, with board 10 is advantageously for only a very short time, such as 1 second or less. Embossing roll 16 can be unheated, but is commonly heated to a temperature in the range of about 65° C. to 427° C. Heating the embossing roll or plate appears to aid in the clarity of transfer of the embossing pattern. This is most apparent in those patterns of more intricate and delicate design.

In a typical embossing step of the present invention, the spacing between rolls 15 and 16 is just about the same as or only very slightly less than the thickness of the substrate being embossed. As a result, the pressure exerted by embossing roll 16 acts predominantly on the embossable coating to impress the roll pattern into said coating, without deforming the substrate or lessening its strength to any significant extent. In another advantageous embodiment of the invention, the embossing and two or more color printings are carried out simultaneously on the coated substrate in a conventional manner by a machine such as a Schmutz printer, a Black Bros. precision coater, or another similar type equipment.

After the embossing step, the embossed coated substrate can be subjected to various conventional finishing apparatuses, such as a saw arrangement for cutting the substrate into smaller panels, applicators for applying coatings to protect and/or decorate the product surface, such as bevel coats, finish spray coats, printing inks, multi-color decorative coatings, and the like, and drying equipment.

The substrate 10, on whose surface the embossed coating of the present invention can be produced, can be any planar construction panel, such as a low or high density fiberboard, particleboard, hardboard, a gypsum wallboard, a synthetic product, including plastic products such as polyvinyl chloride, urethane or other foam, or a metallic substrate. The fiberboard may be manufactured from cellulosic fibers, like wood and bagasse, or from mineral fibers, or from any combination of the two. The product can be used as a ceiling panel, wall panel, exterior siding product, etc. Substrate 10 should have a uniform thickness which can be achieved by sanding one or both surfaces of said substrate or by any other conventional surfacing method for achieving a uniform substrate thickness. Substrate 10 can vary in thickness over a wide range but is commonly about 0.5 inch (1.25 cm) thick. The upper surface of substrate 10 can be of any material such as wood and wood-related products, metal and metal alloys, e.g., aluminum, steel, etc., felt, asbestos, plastic, or any combination of such materials.

The embossable coating 13 to be applied to substrate 10 comprises a filler material, a binder for the filler material, and various additives for special purposes, all in a liquid dispersion medium. An aqueous medium has been found particularly effective.

A wide variety of fillers can be employed in the embossable coating of the invention. The preferred fillers are those which are inorganic, and are finely divided, having an average particle size generally less than 200 microns and preferably less than 100 microns. The filler generally constitutes about 20 to 70, more preferably about 40 to 50, weight percent of the embossable coating. Two especially suitable types of fillers are silica products, both minerals and synthetic amorphous silica, and silicates, both minerals and synthetic products. Examples of suitable fillers include, among others, magnesium silicates (talcs), calcium carbonate, silica, aluminum silicates (clays), calcium metasilicate, asbestos, perlite, and mixtures thereof. Particularly suitable fillers are talc, diatomaceous earth, calcium carbonate, clay, crystalline silica, perlite and mixtures thereof. The diatomaceous earth and perlite are advantageously used in minor amounts in the filler mixtures, as, e.g., in amounts from about 5 to 25, more preferably 10 to 20, weight percent of said mixtures. Especially preferred filler mixtures of the invention comprise a major proportion of talc and a minor proportion of diatomaceous earth, as., e.g., mixtures wherein the weight ratio of talc to diatomaceous earth is about 10:1 to about 7:1.

In the broadest aspects of the present invention, any film-forming binder can be employed that is compatible with the filler in the liquid dispersion medium of the invention and that permits controlled moisture evaporation from the coating during the process of the invention. The binder functions to bind the filler and to produce a film that can be embossed prior to complete drying and that retains a well defined pattern in the embossed and completely dry state. The film-forming process should be gradual so that the film remains sufficiently penetrable by moisture throughout the process to ensure an orderly moisture evaporation therefrom and to prevent surface cracking of the coating. Too fast film-forming binders must be avoided or suitably tailored so as to perform satisfactorily in the process, as, e.g., by the addition of curing rate modifiers, and/or plasticizers. Modifiers may be alkyd resins, properly formulated for compatibility with water-borne vehicles, urea-formaldehyde, polyvinyl alcohols, particularly the partially hydrolyzed grades, and other long-chain, flexible binders. Plasticizers may be internal or external, such as the phthalates, the glycols and other plasticizing water-miscible or soluble additives. Any binder or suitably modified binder can be utilized, provided its curing rate is sufficiently slow to ensure that the embossable coating is maintained in the plastic condition prior to embossment and that the film permits a controlled moisture evaporation from the coating during the process. The preferred binders are thermoplastic resinous materials. Thermosetting resins can also be used. Useful binders include polymers of vinyl, diene, and other polyene monomers, such as vinyl acetate, vinyl chloride, methyl and ethyl acrylate, methyl and ethyl methacrylate, styrene, butadiene, and the like, polyurethanes, and, also, natural binders such as casein, gums and starches. A great number of combinations is possible, using the above mentioned materials. An especially suitable binder is polyvinyl acetate. The binder is employed in an amount sufficient to bind the filler particles together and to adhere the filler to the substrate. The weight ratio of filler to binder in the embossable coating is generally in the range of about 2:1 to about 10:1. At much higher ratios, there is insufficient binder to bind the filler. Lower ratios are possible but are economically undesirable because the filler is less expensive than the binder. A particularly suitable filler to binder weight ratio is about 5:1 to 7:1.

Water is the preferred liquid dispersion medium of the embossable coating composition and is employed in the amount needed to give the embossable coating a workable viscosity prior to its preliminary drying in accordance with the invention. A viscosity range of about 750 to about 5000 centipoises is desirable, with a range of 1,000 to 2,000 centipoises being particularly effective. The viscosity is measured at 25° C. with a Brookfield viscometer. The weight ratio of filler to liquid is generally in the range of about 1:1 to about 5:1.

To achieve excellent design fidelity in the embossed coating, it is most important that said coating does not adhere to the embossing roll after the embossment step. Sticking is prevented by utilizing a release or anti-blocking agent in a quantity sufficient to effect a clean separation of the embossing roll and embossed coating. A wide variety of release or anti-blocking agents can be incorporated in the embossable coating composition, including waxes, fluorocarbons, polyethylene, metallic stearates, and combinations thereof. The anti-blocking agents can be used in various forms, such as in emulsion, dispersion, or powder (solid) form. The polyethylene anti-blocking agents are desirably low molecular weight polymers of ethylene, wherein the molecular weights are preferably in the range of about 2000 to 6000. A highly satisfactory molecular weight range for the polyethylene polymers is from about 2000 to 4000. These polyethylene polymers can advantageously be employed in the form of a dispersion in various suitable solvents, such as water, glycols, butyl cellosolve, etc. Alternatively, they can be emulsified as disclosed in U.S. Pat. No. 3,189,503. Examples of polyethylene anti-blocking agents include the polyethylene dispersion furnished by Daniel Products under the trade name Slip/Ayd, and polyethylene emulsion 39225-A furnished by Michelman Chemicals, Inc.

It has been found advantageous to employ in the embossable coating of the invention an amount of anti-blocking agent that is higher than that used in comparable prior art formulations. For example, a typical formulation of the invention contains an amount of polyethylene dispersion that is two to ten times larger than that which would normally be used in many prior art formulations. The release agent and its amount can vary, depending on many factors, such as embossing temperature, compatibility with the coating to be released, end use of the embossed panel, economics, etc. The release agent can comprise, for example, about 0.25 to 2.5, more preferably 1 to 2, weight percent (of solid release agent) of the embossable coating.

The embossable coating also desirably contains an agent to control moisture retention and evaporation during processing in accordance with the invention. This agent functions to control the moisture content of the embossable coating by contributing to a slowing down of the rate of evaporation. For this purpose, a humectant is included in the embossable coating in a quantity sufficient to promote a controlled moisture evaporation therefrom. Examples of suitable humectants include, among others, ethylene glycol, diethylene glycol, propylene glycol, hexylene glycol, sorbitol, and glycerol, preferably propylene glycol. The humectant is generally used in large amount, and can constitute, for example, about 3 to 10, preferably 4 to 6, weight percent of the embossable coating.

The embossable coating composition can optionally contain additional pigments, e.g., titanium dioxide, iron oxides, umbers, siennas, phthalocyanine green, phthalocyanine blue, and organic reds, as well as preservatives, wetting agents, freezing point depressants, and defoamers.

The present invention provides a highly effective embossing method which yields an embossed coating having a clear and sharp impression therein. Since the embossing can be conducted with very little or no expenditure of heat energy, a significant energy savings becomes possible. Where the present method is performed without substantially compressing the substrate, it avoids or minimizes many of the disadvantageous characteristics associated with the "substrate embossing" methods of the prior art. In the latter methods, the object is to press the board or tile stock itself with an embossing plate or roll, which is conventionally heated to a suitably high temperature, as, e.g., 650° C. In the process, the board fibers can become fragmented, causing the board to lose strength. The board will then sag from a ceiling position or warp unless it is either back-sized or otherwise treated with an additional coverage of paint or other means to counter the effect of fiber fragmentation. Pressing the board can also fracture binders present in the core, such as starches, thus additionally weakening the board. The desired final thickness of the substrate in these prior art methods is attained by using more core material in order to compensate for the thickness loss due to the embossing compression.

Figure 2:
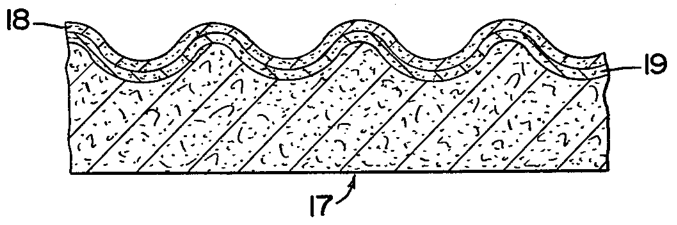
FIG. 2 (PRIOR ART)
FIG. 2 is a diagrammatic fragmentary sectional view through an embossed coated substrate of the prior art.
Figure 3:
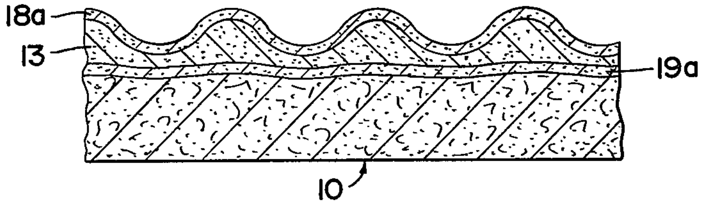
FIG. 3 is a diagrammatic fragmentary sectional view through an embossed coated substrate in accordance with a preferred embodiment of the present invention.

In sharp contrast to the above-noted prior art processes, the present embossing method can be conducted without deforming the substrate, by pressing or embossing a coating formulation applied on the surface of a substrate, without any impressing or with only insubstantial impressing of the substrate itself. Comparison between FIGS. 2 and 3 of the drawings reveals the basic difference between an exemplary embossed coated substrate 17 of the prior art (FIG. 2), and the embossed coated substrate 10 obtained in accordance with the present invention (FIG. 3). In the prior art product, the upper portion of the substrate is seen to be substantially deformed to the same shape impressed in top coat 18 and base coat 19. On the other hand, in the product of the invention the embossment is made in the embossable coating 13 (located between top coat 18*a* and base coat 19*a*) and only a slight impression is made in the substrate.

Many advantages are realized through the nondestructive method of the present invention. There is a cost savings since a thinner board substrate can be used. Because of the minimized fiber fragmentation, the board strength is increased, as evidenced, e.g., in higher values on breakstrength, increased warp and sag resistance, etc. A considerably enhanced detail in the embossed pattern can be obtained, due to the embossing of the coating, and not the board. The embossable coating of the invention can be substantially compressed, and still retain an exceptionally fine detailed pattern. Furthermore, because of the nondestructive nature of the method of the invention, it can be utilized to emboss substrates otherwise unembossable or hard to emboss.

The invention is further illustrated by the following examples:

EXAMPLE 1

This example illustrates the synthesis of an embossable coating composition useful in the present invention.

The following quantities of the following ingredients are combined as indicated.

| Item | Ingredient | Quantity (grams) |
|---|---|---|
| 1. | Filler - talc and diatomaceous earth in a weight ratio of 8:1 | 2043 |
| 2. | Binder - Vinyl acetate homopolymer latex | 714 |
| 3. | Cellulosic thickener | 8 |
| 4. | Pigment dispersant | 4 |
| 5. | Defoamer | 25 |
| 6. | Surfactant | 15 |
| 7. | Preservative | 2 |
| 8. | Anti-blocking dispersion | 112 |
| 9. | Humectant | 250 |
| 10. | Water | 1860 |

The filler is added to the water and the chemical additives 3 through 9, and the ingredients are mixed at high shear. The binder is added subsequently, at lower mixing speed.

The binder is that available from AZS Chemical Company under the trade name "AZS H-81". The pigment dispersant is sodium hexametaphosphate; the defoamer is that available under the trade name "Nopco NDW" from Nopco Chemical Co.; the preservative is that available from Ottawa Chemical Co. under the trade name "Ottacept T", and the humectant is propylene glycol. The anti-blocking dispersion is a polyethylene dispersion, furnished by Daniel Products under the trade name "Slip/Ayd", SL-300.

The resultant embossable coating composition is termed Composition A.

EXAMPLES 2-6

The examples illustrate the synthesis of embossable coating compositions of the invention using a variety of fillers.

The procedure of Example 1 is repeated except that the talc is replaced by an equal weight of calcium carbonate, and the resultant composition termed Composition B.

The procedure of Example 1 is repeated except that the talc is replaced by an equal weight of the two fillers calcium carbonate and china clay, in a weight ratio of 9:1, and the resultant composition termed Composition C.

The procedure of Example 1 is repeated except that the talc is replaced by an equal weight of the two fillers crystalline silica and china clay, in a weight ratio of 9:1, and the resultant composition termed Composition D.

The procedure of Example 1 is repeated except that the talc is replaced by an equal weight of the two fillers calcium carbonate and crystalline silica, in a weight ratio of 9:1, and the resultant composition termed Composition E.

The procedure of Example 1 is repeated except that the diatomaceous earth is replaced by an equal weight of fine perlite, and the resultant composition termed Composition F.

EXAMPLE 7

This example illustrates the process of the present invention for producing an embossed coated substrate by employing in turn each of above embossable coating Compositions A through F.

Figure 4:
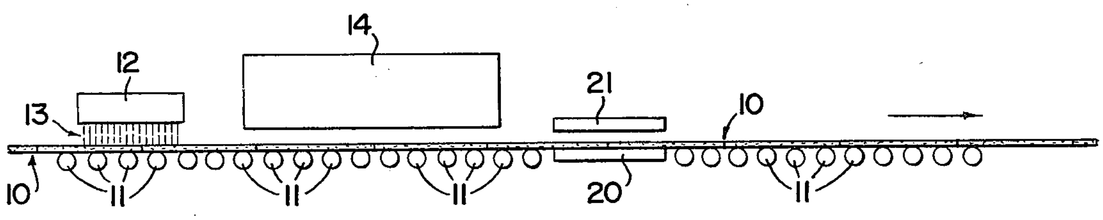
FIG. 4 is a view similar to FIG. 1 showing a board forming process in accordance with a somewhat modified procedure of the invention.

Referring to the board forming process shown in FIG. 4, a substrate 10, which is a one-half inch thick bagasse fiberboard, is passed along conveyor rolls 11. The embossable coating 13 is uniformly applied in the amount of 55 grams per square foot on the surface of substrate 10 by coating applicator 12. The coated substrate is next passed via the conveyor to drier 14, and is dried therein at a temperature in the range from 180° to 240° C. for about 45 to 60 seconds. This drying reduces the water content of the coating to between 14 to 18 weight percent of said total coating weight. After exiting from drier 14, the coated board, with its coating suitably plasticized by the retained water, is then fed between the two plates 20 and 21 of the embossing press. Upper embossing plate 21, which is heated at a temperature between 120° and 200° C., impresses its decorative pattern into the moist embossable coating for a period of 2 to 10 seconds at a pressure of about 175 p.s.i., thereby producing an embossed coated substrate of the invention.

The temperature of the embossing plate can vary widely in accordance with the method of the invention. The embossing plate may be at ambient temperature or advantageously heated at a temperature between room temperature and 315° C., preferably between 120° and 200° C. After exiting from drier 14, the coating will retain some heat, thereby reducing or eliminating the need for the application of heat by the embossing plate. Generally, the thicker the coating applied by applicator 12, the greater is the amount of heat required in the embossing step, and, conversely, the thinner the coating applied, the less the amount of heat needed.

In an alternate embodiment, lower and upper rolls 15 and 16 (See FIG. 1) are used in lieu of the plates. The upper embossing roll may be unheated or heated in the same range as plate 21.

In an advantageous embodiment of the invention, the embossing and two or more color printings are carried out simultaneously on the coated substrate (i.e., with "moist" coating) in a conventional printer to yield an embossed coated substrate of the invention decorated by two-tone, multi-colored or valley printing.

Whereas the present invention has been described with respect to specific embodiments thereof, it should be understood that the invention is not limited thereto, as many modifications thereof may be made. It is, therefore, contemplated to cover by the present application any and all such modifications as fall within the true spirit and scope of the appended claims.

We claim:

1. An embossable coating composition for application to a surface of a substrate at a rate of 25 to 150 grams per square foot of said surface comprising a filler selected from the group consisting of talc and filler mixtures comprising a major proportion of talc, a film-forming binder adapted to bind the filler particles together and to adhere said filler to said substrate, a moisture control agent wherein said moisture control agent is a member selected from the group consisting of propylene glycol, ethylene glycol, diethylene glycol, hexylene glycol, glycerol and combinations there of a release agent, and a liquid, wherein the quantity of said moisture control agent is sufficient to promote controlled moisture evaporation from said composition, whereby said composition is capable of (a) being dried to remove a major portion of said liquid therefrom but to leave sufficient liquid in said composition to render said composition pliable and readily impressible by an embossing means, and (b) being subjected, when said composition is in said pliable and readily impressible condition, to pressure contact with said embossing means to thereby emboss said composition; and wherein the quantity of said release agent is sufficient to render said embossed composition cleanly separable from said embossing means.

2. The composition of claim 1 wherein:

(a) said filler is a finely-divided inorganic material having an average particle size less than 200 microns and selected from the group consisting of talc, and mixtures of talc with calcium carbonate, silica, clay, calcium metasilicate, asbestos, perlite, and titanium dioxide, and (b) said binder is a polymer of a member selected from the group consisting of vinyl monomers, polyene monomers, vinylidene monomers, and combinations thereof.

3. The composition of claim 1 wherein said binder is polyvinyl acetate.

4. The composition of claim 1 wherein the weight ratio of said filler to said binder is 2:1 to 10:1.

5. The composition of claim 1 wherein said liquid is water.

6. The composition of claim 5 which has a viscosity of 750 to 5000 centipoises at 25° C.

7. The composition of claim 5 which has a viscosity of 1000 to 2000 centipoises at 25° C.

8. The composition of claim 5 wherein said moisture control agent is propylene glycol.

9. The composition of claims 1 or 8 wherein said moisture control agent comprises 3 to 10 weight percent of said composition.

10. The composition of claim 5 wherein said release agent is a member selected from the group consisting of polyethylene, a wax, a fluorocarbon, a metallic stearate, and combinations thereof.

11. The composition of claim 5 wherein said release agent is a polyethylene dispersion.

12. The composition of claims 10 or 11 wherein said release agent comprises 0.25 to 2.5 weight percent of said composition.

13. The composition of claims 5, 6, 1 9, 10 or 11 wherein said filler is a member selected from the group consisting of talc, and mixtures of talc with diatomaceous earth, calcium carbonate, clay, crystalline silica, and perlite.

14. The composition of claim 13 wherein said binder is a polyvinyl acetate latex.

15. The composition of claim 5 wherein:

(a) said filler is a finely divided inorganic material having an average particle size less than 200 microns, (b) said binder is a polymer of a member selected from the group consisting of a vinyl monomer, a polyene monomer, a vinylidene monomer, and combinations thereof, is a member selected from the group consisting of propylene glycol, ethylene glycol, diethylene glycol, hexylene glycol, glycerol, and combinations thereof, and (c) said release agent is a member selected from the group consisting of polyethylene, a wax, a fluorocarbon, a metallic stearate, and combinations thereof; and wherein said composition has a viscosity of 750 to 5000 centipoises at 25° C. and the weight ratio of said filler to said binder is 2:1 to 10:1.

16. The composition of claim 15 wherein:

(a) said filler is a mixture of talc and diatomaceous earth, the weight ratio of said talc to diatomaceous earth being 10:1 to 7:1, (b) said binder is a polyvinyl acetate latex, the filler to binder weight ratio being 5:1 to 7:1, and (c) said moisture control agent is propylene glycol.

17. The composition of claim 15 wherein:

(a) said filler is a mixture of talc and diatomaceous earth, the weight ratio of said talc to diatomaceous earth being 10:1 to 7:1, (b) said binder is a polyvinyl acetate latex, the filler to binder weight ratio being 5:1 to 7:1, and (c) said release agent is a polyethylene dispersion.

18. The composition of claim 15 wherein:

(a) said filler is a mixture of fine perlite and talc in a weight ratio of 1:8, (b) said binder is a polyvinyl acetate latex, the filler to binder weight ratio being 5:1 to 7:1, and (c) said moisture control agent is propylene glycol and said release agent is a polyethylene dispersion.

19. The composition of claim 15 wherein:

(a) said filler is a member selected from the group consisting of talc, and mixtures of talc with diatomaceous earth, calcium carbonate, clay, crystalline silica, and perlite , and (b) said binder is a polyvinyl acetate latex.

20. The composition of claim 19 wherein said moisture control agent is propylene glycol and said release agent is a polyethylene dispersion.

21. The composition of claim 20 wherein said filler is a mixture of talc and diatomaceous earth, the weight ratio of said talc to diatomaceous earth being 10:1 to 7:1, and the filler to binder weight ratio being 5:1 to 7:1.

22. The composition of claim 21 wherein:

(a) said moisture control agent comprises 3 to 10 weight percent of said composition, and (b) said release agent comprises 0.25 to 2.5 weight percent of said composition.

* * * * *